United States Patent [19]

Isogai et al.

[11] Patent Number: 5,298,590
[45] Date of Patent: Mar. 29, 1994

[54] LIQUID CRYSTAL ALIGNMENT TREATING AGENT

[75] Inventors: Hideyuki Isogai; Toyohiko Abe; Yoshihiro Tsuruoka; Hiroyoshi Fukuro, all of Funabashi, Japan

[73] Assignee: Nissan Chemical Industries Ltd., Tokyo, Japan

[21] Appl. No.: 929,012

[22] Filed: Aug. 13, 1992

[30] Foreign Application Priority Data

Aug. 13, 1991 [JP] Japan ................. 3-202916

[51] Int. Cl.⁵ ............................... C08G 73/10
[52] U.S. Cl. ............................... 528/188; 528/26; 528/33; 528/38; 528/125; 528/128; 528/170; 528/172; 528/173; 528/174; 528/183; 528/185; 528/220; 528/229; 528/336; 528/350; 528/351; 528/353; 428/1
[58] Field of Search ............... 528/26, 33, 38, 88, 528/125, 128, 183, 185, 125, 170, 353, 172, 173, 174, 351, 350, 336, 220, 229; 428/1

[56] References Cited

U.S. PATENT DOCUMENTS

| Re. 33,342 | 9/1990 | Kohtoh et al. | 528/351 |
|---|---|---|---|
| 4,405,208 | 9/1983 | Shirai | 350/341 |
| 4,634,228 | 1/1987 | Iwasaki et al. | 350/341 |
| 4,749,777 | 6/1988 | Kohtoh et al. | 428/1 |
| 4,781,439 | 11/1988 | Yokokura et al. | 350/341 |
| 4,820,026 | 4/1989 | Okada et al. | 350/341 |
| 4,838,658 | 6/1989 | Zondler | 428/1 |
| 4,864,008 | 9/1989 | Murata et al. | 528/125 |
| 4,879,059 | 11/1989 | Hanyu et al. | 428/1 |
| 4,883,344 | 11/1989 | Okada et al. | 350/341 |
| 4,929,658 | 5/1990 | Kohtoh | 528/292 |
| 5,046,822 | 9/1991 | Matsuda et al. | 428/1 |
| 5,053,544 | 10/1991 | Murata et al. | 564/430 |
| 5,084,557 | 1/1992 | Murata | 528/353 |
| 5,144,078 | 9/1992 | Nagase | 528/353 |
| 5,148,300 | 1/1992 | Mizushima et al. | 428/1 |
| 5,186,985 | 2/1993 | Estes et al. | 428/1 |

FOREIGN PATENT DOCUMENTS

| 0059790 | 9/1982 | European Pat. Off. |
| 0365855 | 5/1990 | European Pat. Off. |
| 0415447 | 3/1991 | European Pat. Off. |

OTHER PUBLICATIONS

Liq. Cryst. 1991, vol. 202, pp. 126–128, B. Myrvold, "the Relationship Between the Physical Properties of the Alignment Layer and the Quality of SSFLC Cells".

Primary Examiner—Morton Foelak
Assistant Examiner—P. Hampton-Hightower
Attorney, Agent, or Firm—Oblon, Spivak, McClelland, Maier & Neustadt

[57] ABSTRACT

The present invention relates to a liquid crystal alignment treating agent which comprises a polyimide resin prepared from a diamine including an aromatic diamine having at least one linear alkyl group of at least 6 carbon atoms per benzene ring as the essential component and a tetracarboxylic acid and its derivative.

The liquid crystal alignment treating agent obtained in accordance with the present invention comprises a polyimide resin having an alkyl group on a side chain, and accordingly provides a liquid crystal-aligned film containing liquid crystal molecules stably having an enhanced inclined alignment angle (tilt angle) to a substrate.

4 Claims, No Drawings

LIQUID CRYSTAL ALIGNMENT TREATING AGENT

The present invention relates to a novel liquid crystal alignment treating agent, and particularly relates to a liquid crystal-aligned film comprising a polyimide resin having a linear alkyl group on a side chain synthesized from an organic diamine derivative having a linear alkyl group as a starting material, wherein a liquid crystal molecule stably has an enhanced inclined alignment angle to a substrate.

A liquid crystal cell is a display element utilizing an electrooptical change of liquid crystal, and is noted for being small and light as a device and consuming less electric power. Accordingly, recently, it has been remarkably developed as a display device for various displays.

Above all, a typical example includes a twisted nematic type (TN-type) electric field-effect type liquid crystal cell using a nematic liquid crystal having a positive dielectric anisotropy, wherein liquid crystal molecules are arranged on each surface of a pair of opposed electrode substrates in parallel to the substrate and the two substrates are combined in such a manner as to make the alignment directions of the liquid crystal molecules cross at right angles.

It is important for such a TN-type liquid crystal cell to have the major axis direction of a liquid crystal molecule uniformly aligned on the substrate surface in parallel and to have a liquid crystal molecule aligned at a predetermined inclined alignment angle (hereinafter referred to as "tilt angle") to the substrate. Heretofore, two methods are known as a typical method for aligning liquid crystal.

The first method comprises vapor-depositing an inorganic material such as silicon oxide obliquely to a substrate to form an inorganic film on the substrate and aligning liquid crystal molecules along the vapor-deposition direction. This method achieves stable alignment, but is not efficient for industrial use.

The second method comprises forming an organic film on a substrate surface, rubbing the surface with a cloth such as cotton, nylon or polyester at a constant direction and aligning liquid crystal molecules along the rubbing direction. This method relatively easily achieves stable alignment and is therefore often used for practical use. Examples of the organic film includes polyvinyl alcohol, polyoxyethylene, polyamide, polyimide and the like, but polyimide is most generally used due to its chemical stability and heat stability.

However, a tilt angle obtained by rubbing a polyimide resin was generally about from 1° to 3°, and it was difficult to obtain a higher tilt angle.

According to the method for vapor-depositing an inorganic material obliquely to a substrate, a stable tilt angle can be obtained, but this method is not always efficient for practical industrial production. On the other hand, according to the method for rubbing a polyimide resin, it is difficult to obtain a high tile angle. In order to solve these problems, Japanese Unexamined Patent Publication No. 142099/1987 proposes a liquid crystal alignment treating agent comprising the reaction product of a long chain alkyl amine and a polyimide resin precursor. In this case, it is shown that a tilt angle is enhanced by introducing a long chain alkyl group, but the enhancement of the tilt angle is limited since the amount of the long chain alkyl group introduced is limited. Also, Japanese Unexamined Patent Publication Nos. 262527/1989 and 262528/1989 propose a liquid crystal alignment agent comprising a mixture of a long chain alkyl compound and a polyimide resin precursor. In this case, the amount of the long chain alkyl group introduced is not limited and the tilt angle can be controlled in a wide range by controlling the amount of the long chain alkyl group introduced. However, in the case of using such a mixture, there are problems that the density of the alkyl group on the polyimide surface varies depending on the coating thickness and accordingly that the tilt angle also varies depending on the coating thickness.

On the other hand, Japanese Unexamined Patent Publication No. 25126/1989 proposes a liquid crystal alignment treating agent comprising a polyimide prepared from a diamine containing an alkyl group as a starting material. In this case, the variation of a tilt angle by a coating thickness can be controlled, but the tilt angle obtained is limited since the density of an alkyl group per diamine is low. Thus, there has been a demand for developing an alignment agent having a satisfactory tilt angle which can be controlled in a wide range by rubbing a polyimide and which does not vary by a coated film thickness.

The present inventors have studied to solve the above mentioned problems, and as a result of the study, have completed the present invention.

Thus, the present invention relates to a liquid crystal alignment treating agent which comprises a polyimide resin comprising a diamine including an aromatic diamine having at least one linear alkyl group of at least 6 carbon atoms per benzene ring as the essential diamine component and a tetracarboxylic acid and its derivative.

The present invention further relates to a liquid crystal alignment treating agent comprising a polyimide resin prepared by reacting a diamine including at least 5 mol % of an aromatic diamine having at least one linear alkyl group of at least 6 carbon atoms per benzene ring as the essential diamine component with a tetracarboxylic acid and its derivative to prepare a polyimide resin precursor having a reduced viscosity of from 0.05 to 3.0 dl/g (concentration: 0.5 g/dl in N-methylpyrrolidone at 30° C.) and converting the polyimide resin precursor thus prepared to a polyimide resin by dehydration-ring closure reaction.

The present invention still further relates to a liquid crystal alignment treating agent which comprises a polyimide resin prepared by reacting a diamine including at least 5 mol % of a linear alkyl group-containing diaminobenzene derivative having the formula (1),

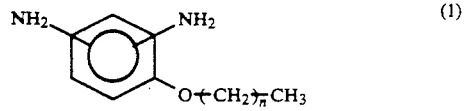

(wherein n is an integer of from 5 to 21) as the essential diamine component with a tetracarboxylic acid and its derivative to prepare a polyimide resin precursor having a reduced viscosity of from 0.05 to 3.0 dl/g (concentration: 0.5 g/dl in N-methylpyrrolidone at 30° C.) and converting the polyimide resin precursor thus prepared into a polyimide resin by dehydration-ring closure reaction.

The liquid crystal alignment treating agent of the present invention is used as a liquid crystal aligned film which is prepared by coating a polyimide resin precursor solution on a transparent substrate such as a glass or plastic film having a transparent electrode attached to form a polyimide resin film and then subjecting the polyimide resin film thus formed to rubbing treatment.

The liquid crystal-aligned film of the present invention comprises a polyimide resin having a linear alkyl group on a side chain prepared by using an aromatic diamine having at least one linear alkyl group per benzene ring as the essential diamine component, and a tilt angle can be controlled in a wide range and also the tilt angle does not substantially vary depending on the film thickness since the density distribution of the alkyl group on the polyimide resin surface can be controlled by adjusting the mol fraction of the aromatic diamine.

A method for preparing the polyimide resin of the present invention is not specially limited, but generally it can be obtained by reacting and polymerizing a tetracarboxylic acid and its derivative with a primary diamine to form a polyimide resin precursor and subjecting the polyimide resin precursor to imide-formation by dehydration-ring closure reaction.

The tetracarboxylic acid and its derivative used for preparing the polyimide resin of the present invention are not specially limited.

Examples of the tetracarboxylic acid and its derivative include aromatic tetracarboxylic acids such as pyromellitic acid, 2,3,6,7-naphthalenetetracarboxylic acid, 1,2,5,6-naphthalenetetracarboxylic acid, 1,4,5,8-naphthalenetetracarboxylic acid, 2,3,6,7-anthracenetetracarboxylic acid, 1,2,5,6-anthracenetetracarboxylic acid, 3,3', 4,4'-biphenyltetracarboxylic acid, 2,3,3',4-biphenyltetracarboxylic acid, bis(3,4-dicarboxyphenyl)ether, 3,3',4,4'-benzophenonetetracarboxylic acid, bis(3,4-dicarboxyphenyl)sulfone, bis(3,4-dicarboxyphenyl)methane, 2,2-bis(3,4-dicarboxyphenyl)propane, 1,1,1,3,3,3-hexafluoro-2,2-bis(3,4-dicarboxyphenyl)propane, bis(3,4-dicarboxyphenyl)dimethylsilane, bis(3,4-dicarboxyphenyl)diphenylsilane, 2,3,4,5-pyridine tetracarboxylic acid and 2,6-bis(3,4-dicarboxyphenyl)pyridine, and their dianhydrides, and their dicarboxylic acid diacid halides; cycloaliphatic tetracarboxylic acids such as cyclobutane tetracarboxylic acid, cyclopentane tetracarboxylic acid, cyclohexane tetaracarboxylic acid, 2,3,5-tricarboxycyclopentylacetic acid and 3,4-dicarboxy-1,2,3,4-tetrahydro-1-naphthalene succinic acid, and their dianhydrides, and their dicarboxylic acid diacid halides; and aliphatic tetracarboxylic acids such as butane tetracarboxylic acid, and their dianhydrides, and their dicarboxylic acid diacid halides.

These tetracarboxylic acids and their derivatives may be used respectively alone or in a mixture of two or more.

According to the present invention, a polyimide resin having a linear alkyl group of at least 6 carbon atoms on a side chain can be prepared by copolymerizing a tetracarboxylic acid and its derivative with an aromatic diamine having at least one linear alkyl group of at least 6 carbon atoms per benzene ring (hereinafter referred to as "alkyldiamine") and the other general diamines (hereinafter referred to as "general diamine"), and a tilt angle of a liquid crystal can be stably enhanced in a wide range by controlling the alkyl group density at the side chain. Thus, a diamine used for preparing the polyimide resin of the present invention contains an alkyl diamine as the essential component.

The alkyl group in the alkyl diamine is a linear alkyl group having at least 6 carbon atoms, preferably at least 8 carbon atoms, and is substantially a linear alkyl group having from 6 to 22 carbon atoms. If the carbon number of the linear alkyl group is 5 or less, the effect for enhancing a tilt angle (one of the essential features of the present invention) is not satisfactory. Also, the alkyl diamine must have at least one alkyl group per benzene ring. If the alkyl diamine does not have at least one alkyl group per benzene ring, the alkyl group density in the polyimide resin becomes low and accordingly the range in which the tilt angle can be controlled, becomes narrow.

Examples of the alkyl diamine used in the present invention include a diaminobenzene derivative of the formula,

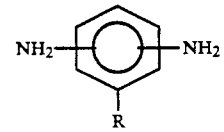

a diaminobiphenyl derivative of the formula,

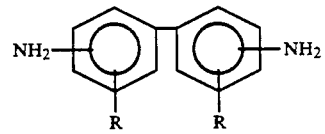

a diaminoterphenyl derivative of the formula,

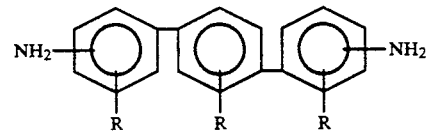

a diaminodiphenylether derivative of the formula,

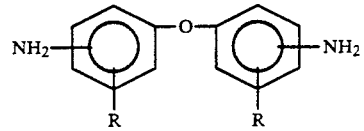

a diaminodiphenylmethane derivative of the formula,

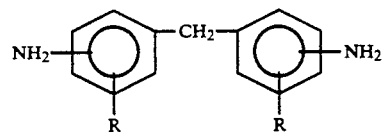

and a bis(aminophenoxy)phenyl derivative of the formula,

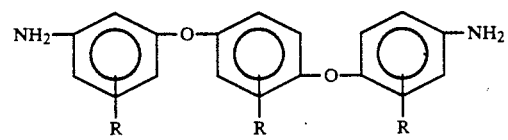

wherein R is a linear alkyl group, an alkyloxy group or an alkyloxymethylene group, respectively having at least 6 carbon atoms.

These alkyldiamines may be used respectively alone or in a mixture of two or more.

General diamines other than the alkyl diamines are primary diamines generally used for synthesizing a polyimide, and are not specially limited.

Examples of general diamines include aromatic diamines such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminobiphenylmethane, diaminodiphenylether, 2,2-diaminodiphenylpropane, bis(3,5-diethyl-4-aminophenyl)methane, diaminodiphenylsulfone, diaminobenzophenone, diaminonaphthalene, 1,4 bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl)hexafluoropropane and 2,2-bis[4(4-aminophenoxy)phenyl]hexafluoropropane; cycloaliphatic diamines such as bis(4-aminocyclohexyl)methane and bis(4-amino-3-methylcyclohexyl)methane; aliphatic diamines such as tetramethylenediamine and hexamethylenediamine; and diaminosiloxane of the formula,

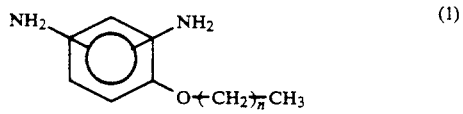

(wherein n is an integer of from 1 to 10).

These diamines may be used respectively alone or in a mixture of two or more.

A tilt angle of a liquid crystal can be stably controlled in a wide range of from 1° to 90° by controlling the ratio of the mol number of an alkyl diamine to the total mol number of diamines used in the polymerization of a polyimide resin of the present invention. The content of the alkyl diamine is preferably from 5 mol % to 100 mol %.

In order to achieve the object of the present invention, it is particularly preferable to use a diaminobenzene derivative of the formula (1),

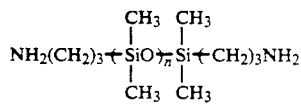

(1)

(wherein n is an integer of from 5 to 21) as an alkyldiamine for easily controlling a tilt angle, widening the controllable tilt angle range and enabling easy syntheses of a diamine.

The polyimide resin of the present invention is prepared by reacting and polymerizing a tetracarboxylic acid and its derivative with an alkyl diamine and a general diamine to form a polyimide resin precursor and then subjecting the polyimide resin precursor to imide-formation by dehydration-ring closure reaction, and the tetracarboxylic acid and its derivative used in this reaction is generally a tetracarboxylic acid dianhydride. The molar ratio of the mol number of the tetracarboxylic acid dianhydride/the total mol number of the alkyl diamine and the general diamine is preferably from 0.8 to 1.2. In the same manner as in ordinary condensation polymerization, the polymerization degree of the polymer thus formed becomes high according as this molar ratio becomes closer to 1.

If the polymerization degree is too low, the stability of alignment of liquid crystal becomes poor since the strength of the polyimide resin film used as an aligned film is unsatisfactory.

On the contrary, if the polymerization degree is too high, the workability at the time of forming a polyimide resin film sometimes becomes unsatisfactory.

Thus, the polymerization degree of the product of this reaction should preferably be from 0.05 to 3.0 dl/g (concentration: 0.5 g/dl in N-methylpyrrolidone at 30° C.) in terms of a reduced viscosity of a polyimide resin precursor solution.

A method for reacting and polymerizing a tetracarboxylic acid dianhydride with a primary diamine is not specially limited, but generally comprises dissolving the primary diamine in an organic polar solvent such as N-methylpyrrolidone, N,N-dimethylacetamide or N,N-dimethylformamide, adding the tetracarboxylic acid dianhydride to the resultant solution to react to form a polyimide resin precursor and then subjecting the resultant polyimide resin precursor to imide-formation by dehydration-ring closure.

The temperature of the reaction of a tetracarboxylic acid dianhydride and a primary diamine to prepare a polyimide resin precursor is optionally selected from the range of from −20° to 150° C., preferably from −5° to 100° C.

The polyimide resin precursor thus prepared is converted to a polyimide resin by heat-dehydrating at a temperature of from 100° to 400° C. or by chemically imide-forming by means of an imide-forming catalyst such as triethylamine/acetic anhydride generally used.

When using the polyimide resin of the present invention as an alignment treating agent, it is necessary to form a polyimide resin film having a thickness of from 200 to 3,000 μm on a substrate having a transparent electrode attached.

A method for forming the polyimide resin film is not specially limited. Generally, a polyimide resin precursor solution is coated on a substrate as it is, and the polyimide resin precursor is converted to a polyimide resin by heating to form a polyimide resin film on the substrate. As the polyimide resin precursor solution used herein, the above mentioned polymerization solution may be used as it is, or the prepared polyimide resin precursor may be added to an excess amount of a bad solvent such as methanol or water and recovered as a precipitate which may then be redissolved in a solvent. A solvent for diluting the above mentioned polyimide resin precursor solution and/or a solvent for redissolving the polyimide resin precursor recovered by precipitation, are not specially limited so long as it dissolves the polyimide resin precursor.

Examples of these solvents include N-methylpyrrolidone, N,N-dimethylacetamide, N,N-dimethylformamide and the like. These solvents may be used respectively alone or may be used in a mixture.

Moreover, a solvent which will not produce a uniform solution when used alone, may be admixed to the extent that a uniform solution can be obtained.

A temperature at which the imide-formation is conducted by heating, is optionally selected from the range of from 100° to 400° C., preferably from 150° to 350° C.

When a polyimide resin of the present invention is soluble in a solvent, a polyimide resin precursor obtained by the reaction of a tetracarboxylic acid dianhydride and a primary diamine can be converted in solution into a polyimide to prepare a polyimide resin solution.

The conversion of the polyimide resin precursor into the polyimide resin in solution, is generally conducted by dehydration-ring closure process by heating. The ring closing temperature at the heat-dehydration is optionally selected from the range of from 100° to 350° C., preferably from 120° to 250° C.

Another method for converting a polyimide resin precursor into a polyimide, comprises chemically conducting ring closure by using a known dehydration-ring closure catalyst.

The polyimide resin solution thus obtained can be used as it is, or it may be used after isolating the polyimide resin by precipitating in a bad solvent such as methanol and ethanol and redissolving the isolated polyimide resin in a suitable solvent.

The solvent used for redissolution is not specially limited as long as it dissolves the polyimide resin thus obtained, and examples of the solvent include 2-pyrrolidone, N-methylpyrrolidone, N-ethylpyrrolidone, N-vinylpyrrolidone, N,N-dimethylacetamide, N,N-dimethylformamide, $\gamma$-butyrolactone and the like.

Furthermore, other solvents which will not dissolve the polyimide resin when used alone, may be added to the above mentioned solvents as far as the solubility is not impaired.

Examples of such solvents include ethyl cellosolve, butyl cellosolve, ethylcarbitol, butylcarbitol, ethylcarbitol acetate, ethylene glycol and the like.

In order to further improve the adhesion between a polyimide resin film and a substrate, it is preferable to admix an additive such as a coupling agent with the polyimide resin solution thus prepared. A polyimide resin film can be formed on a substrate by coating this solution on the substrate and evaporating the solvent. The temperature used in this step is selected simply for evaporating the solvent, and a temperature in the range of from 80° to 150° C. will be sufficient for this evaporation.

In this manner, a polyimide resin film having a thickness of from 200 to 3,000 Å is formed on a transparent substrate such as a glass or plastic film having a transparent electrode attached, and the polyimide resin layer was subjected to rubbing treatment to form a liquid crystal-aligned film.

The present invention is further illustrated by the following Examples in more detail, but should not be limited thereto.

EXAMPLE 1

2.92 g (0.01 mol) of 2-dodecyloxy-1,4-diaminobenzene, 36.9 g (0.09 mol) of 2,2-bis[4-(4-aminophenoxy)-phenyl]propane (hereinafter referred to as "BAPB") and 21.8 g (0.1 mol) of pyromellitic dianhydride (hereinafter referred to as "PMDA") were dissolved in 350 g of N-methylpyrrolidone (hereinafter referred to as "NMP"), and were stirred at 20° C. for 4 hours to conduct polycondensation reaction for preparing a polyamic acid intermediate solution.

The polymer thus prepared had a reduced viscosity of 1.10 dl/g (concentration: 0.5 g/dl in NMP at 30° C.).

This solution was diluted with NMP, and was spin-coated on a glass substrate having a transparent electrode attached, and was heat-treated at a temperature as indicated in Table 1 to form a uniform polyimide film.

After rubbing this film with a cloth, two of the plates thus obtained were placed in such a manner as to make the rubbing directions in parallel each other by intervening a spacer of 50 $\mu$m therebetween and a liquid crystal (ZLI-2293 manufactured by Merck Co.) was poured between the two plates to produce a homogeneously aligned liquid crystal cell.

The cell thus produced was rotated under crossed nicol, and light and darkness were clearly recognized, which proved the formation of a satisfactory alignment along the rubbing direction.

A tilt angle of this cell was measured by crystal rotation method, and the result is shown in Table 1.

EXAMPLE 2

A polyamic acid intermediate solution was prepared in the same manner as in Example 1, except that 5.85 g (0.02 mol) of 2-dodecyloxy-1,4-diaminobenzene, 32.8 g (0.08) of BAPB, 21.8 g (0.1 mol) of PMDA and 340 g of NMP were used.

The polymer thus prepared had a reduced viscosity of 0.92 dl/g (concentration: 0.5 g/dl in NMP at 30° C.).

A liquid crystal cell produced in the same manner as in Example 1 was rotated under crossed nicol, and as this result, light and darkness were clearly recognized, which proved the formation of a satisfactory alignment along the rubbing direction.

A tilt angle of this cell was measured by crystal rotation method, and the result is shown in Table 1.

EXAMPLE 3

A polyamic acid intermediate solution was prepared in the same manner as in Example 1, except that 5.85 g (0.02 mol) of 2-dodecyloxy-1,4-diaminobenzene, 8.65 g (0.08 mol) of p-phenylenediamine, 21.8 g (0.1 mol) of PMDA and 206 g of NMP were used.

The polymer thus prepared had a reduced viscosity of 0.89 dl/g (concentration: 0.5 g/dl in NMP at 30° C.).

A liquid crystal cell produced in the same manner as in Example 1, was rotated under crossed nicol, and as this result, light and darkness were clearly recognized, which proved the formation of a satisfactory alignment along the rubbing direction.

A tilt angle of this cell was measured by crystal rotation method, and the result is shown in Table 1.

EXAMPLE 4

A polyamic acid intermediate solution was prepared in the same manner as in Example 1, except that 5.85 g (0.02 mol) of 2-dodecyloxy-1,4-diaminobenzene, 16.98 g (0.08 mol) of o-toluidine, 21.8 g (0.1 mol) of PMDA and 250 g of NMP were used.

The polymer thus prepared had a reduced viscosity of 0.83 dl/g (concentration: 0.5 g/dl in NMP at 30° C.).

A liquid crystal cell produced in the same manner as in Example 1, was rotated under crossed nicol, and as this result, light and darkness were clearly recognized, which proved the formation of a satisfactory alignment along the rubbing direction.

A tilt angle of this cell was measured by crystal rotation method, and the result is shown in Table 1.

EXAMPLE 5

A polyamic acid intermediate solution was prepared in the same manner as in Example 1, except that 5.85 g (0.02 mol) of 2-dodecyloxy-1,4-diaminobenzene, 32.8 g (0.08 mol) of BAPB, 19.60 g (0.1 mmol) of 1,2,3,4-cyclobutanetetracarboxylic dianhydride (hereinafter referred to as "CBDA") and 330 g of NMP were used.

The polymer thus prepared had a reduced viscosity of 0.96 dl/g (concentration: 0.5 g/dl in NMP at 30° C.).

A liquid crystal cell produced in the same manner as in Example 1, was rotated under crossed nicol, and as this result, light and darkness were clearly recognized, which proved the formation of a satisfactory alignment along the rubbing direction.

A tilt angle of this cell was measured by crystal rotation method, and the result is shown in Table 1.

EXAMPLE 6

A polyamic acid intermediate solution was prepared in the same manner as in Example 1, except that 20.47 g (0.07 mol) of 2-dodecyloxy-1,4-diaminobenzene, 12.3 g (0.03 mol) of BAPB, 19.60 g (0.1 mmol) of CBDA and 297 g of NMP were used.

The polymer thus prepared had a reduced viscosity of 0.76 dl/g (concentration: 0.5 g/dl in NMP at 30° C.).

A liquid crystal cell was produced in the same manner as in Example 1, and a tilt angle was measured by crystal rotation method. As this result, it was proved that the tilt angle was higher than 15° which is the measurement limit by crystal rotation method.

This crystal cell was observed by a polalization microscope, and a clear isogyre was observed in the vicinity of the center of the field of view, which proved that the tile angle was almost 90°.

EXAMPLE 7

A polyamic acid intermediate solution was prepared in the same manner as in Example 1, except that 29.2 g (0.1 mol) of 2-dodecyloxy-1,4-diaminobenzene, 19.6 g (0.1 mmol) of CBDA and 277 g of NMP were used without using BAPB.

The polymer thus prepared had a reduced viscosity of 0.62 dl/g (concentration: 0.5 g/dl in NMP at 30° C.).

A liquid crystal cell was produced in the same manner as in Example 1, and a tilt angle was measured by crystal rotation method. As this result, it was proved that the tilt angle was higher than 15° which is the measurement limit by crystal rotation method.

This crystal cell was observed by a polalization microscope, and a clear isogyre was observed in the vicinity of the center of the field of view, which proved that the tile angle was almost 90°.

EXAMPLE 8

A polyamic acid intermediate solution was prepared in the same manner as in Example 1, except that 5.85 g (0.02 mol) of 2-dodecyloxy-1,4-diaminobenzene, 32.8 g (0.08 mol) of BAPB, 30.0 g (0.1 mmol) of 3,4-dicarboxy-1,2,3,4-tetrahydro-1-naphthalene succinic dianhydride and 390 g of NMP were used.

The polymer thus prepared had a reduced viscosity of 0.42 dl/g (concentration: 0.5 g/dl in NMP at 30° C.).

50 g of this solution, were added 5 g of pyridine and 10.8 g of acetic anhydride, and imide-formation reaction was conducted at 40° C. for 3 hours. The reaction solution was poured into 500 ml of methanol to obtain a white precipitate, and the precipitate was filtrated and dried to obtain a white polyimide powder.

1.0 g of the powder thus obtained was dissolved in 30 g of γ-butyrolactone to prepare a polyimide resin solution.

A liquid crystal cell was produced in the same manner as in Example 1, and was rotated under crossed nicol. As this result, light and darkness were clearly recognized, which proved the formation of a satisfactory alignment along the rubbing direction.

A tilt angle of this cell was measured by crystal rotation method, and the result is shown in Table 1.

COMPARATIVE EXAMPLE 1

A polyamic acid intermediate solution was prepared in the same manner as in Example 1, except that 41.0 g (0.1 mol) of BAPB, 21.8 g (0.1 mol) of PMDA and 356 g of NMP were used without using 2-dodecyloxy-1,4-diaminobenzene.

The polymer thus prepared had a reduced viscosity of 1.20 dl/g (concentration: 0.5 g/dl in NMP at 30° C.).

A liquid crystal cell was produced in the same manner as in Example 1, and was rotated under crossed nicol. As this result, light and darkness were clearly recognized, which proved the formation of a satisfactory alignment along the rubbing direction.

A tilt angle of this cell was measured by crystal rotation method, and the result is shown in Table 1.

COMPARATIVE EXAMPLE 2

A polyamic acid intermediate solution was prepared in the same manner as in Example 3, except that 10.8 g (0.1 mol) of p-phenylenediamine, 21.8 g (0.1 mol) of PMDA and 185 g of NMP were used without using 2-dodecyloxy-1,4-diaminobenzene.

The polymer thus prepared had a reduced viscosity of 0.99 dl/g (concentration: 0.5 g/dl in NMP at 30° C.).

A liquid crystal cell was produced in the same manner as in Example 1, and was rotated under crossed nicol. As this result, light and darkness were clearly recognized, which proved the formation of a satisfactory alignment along the rubbing direction.

A tilt angle of this cell was measured by crystal rotation method, and the result is shown in Table 1.

COMPARATIVE EXAMPLE 3

A polyamic acid intermediate solution wa prepared in the same manner as in Example 4, except that 21.2 g (0.1 mol) of o-toluidine, 21.8 g (0.1 mol) of PMDA and 244 g of NMP were used without using 2-dodecyloxy-1,4-diaminobenzene.

The polymer thus prepared had a reduced viscosity of 0.99 dl/g (concentration: 0.5 g/dl in NMP at 30° C.).

A liquid crystal cell was produced in the same manner as in Example 1, and was rotated under crossed nicol. As this result, light and darkness were clearly recognized, which proved the formation of a satisfactory alignment along the rubbing direction.

A tilt angle of this cell was measured by crystal rotation method, and the result is shown in Table 1.

COMPARATIVE EXAMPLE 4

A polyamic acid intermediate solution was prepared in the same manner as in Example 5, except that 41.0 g (0.1 mol) of BAPB, 19.6 g (0.1 mol) of CBDA and 343 g of NMP were used without using 2-dodecyloxy-1,4-diaminobenzene.

The polymer thus prepared had a reduced viscosity of 1.20 dl/g (concentration: 0.5 g/dl in NMP at 30° C.).

A liquid crystal cell was produced in the same manner as in Example 1, and was rotated under crossed nicol. As this result, light and darkness were clearly recognized, which proved the formation of a satisfactory alignment along the rubbing direction.

A tilt angle of this cell was measured by crystal rotation method, and the result is shown in Table 1.

COMPARATIVE EXAMPLE 5

A polyamic acid intermediate solution was prepared in the same manner as in Example 8, except that 41.0 g (0.1 mol) of BAPB, 30.0 g (0.1 mol) of 3,4-dicarboxy-1,2,3,4-tetrahydro-1-naphthalenesuccinic dianhydride and 400 g of NMP were used without using 2-dodecyloxy-1,4-diaminobenzene.

The polymer thus prepared had a reduced viscosity of 0.50 dl/g (concentration: 0.5 g/dl in NMP at 30° C.).

The imide-forming reaction was conducted in the same manner as in Example 8 to obtain a white polyimide powder.

1.0 g of this powder was dissolved in 30 g of γ-butyrolacotne to prepare a polyimide resin solution.

A liquid crystal cell was produced in the same manner as in Example 1, and was rotated under crossed nicol. As this result, light and darkness were clearly recognized, which proved the formation of a satisfactory alignment along the rubbing direction.

A tilt angle of this cell was measured by crystal rotation method, and the result is shown in Table 1.

TABLE 1

|  | Treatment temperature (°C.) | Film thickness (Å) | Tilt angle (deg) |
| --- | --- | --- | --- |
| Example 1 | 250 | 500 | 6.0 |
|  |  | 1000 | 5.9 |
| Example 2 | 250 | 500 | 8.0 |
|  |  | 1000 | 8.0 |
| Example 3 | 250 | 500 | 4.8 |
| Example 4 | 250 | 500 | 5.5 |
| Example 5 | 180 | 500 | 3.8 |
|  | 250 | 500 | 6.5 |
| Example 6 | 180 | 500 | 90 |
| Example 7 | 180 | 500 | 90 |
| Example 8 | 120 | 500 | 6.5 |
| Comparative Example 1 | 250 | 500 | 3.9 |
| Comparative Example 2 | 250 | 500 | 3.8 |
| Comparative Example 3 | 250 | 500 | 3.5 |
| Comparative Example 4 | 180 | 500 | 2.1 |
|  | 250 | 500 | 4.7 |
| Comparative Example 5 | 120 | 500 | 0.6 |

The liquid crystal alignment treating agent of the present invention provides a stable high tilt angle by using a polyimide resin having a linear alkyl group on a side chain prepared by using an aromatic diamine having a linear alkyl chain.

Since the alkyl group density in the polyimide resin can be optionally controlled, a tilt angle can be controlled in the wide range of from 1° to 90°.

We claim:

1. A nematic liquid crystal alignment treating agent which comprises a polyimide resin comprising a diamine including an aromatic diamine having at least one linear alkyl group of at least 12 carbon atoms per benzene ring as the essential diamine component and a tetracarboxylic acid and its derivative, which diamine is selected from the group consisting of a diaminobenzene derivative of the formula,

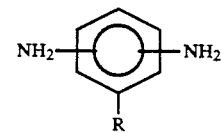

a diaminobiphenyl derivative of the formula,

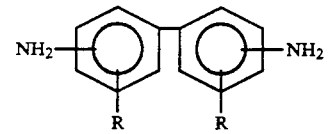

a diaminoterphenyl derivative of the formula,

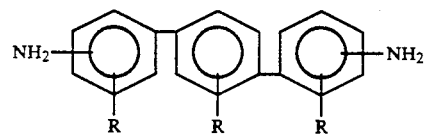

a diaminodiphenylether derivative of the formula,

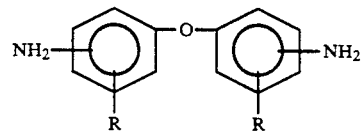

a diaminodiphenylmethane derivative of the formula,

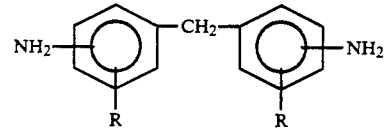

and a bis(aminophenoxy)phenyl derivative of the formula,

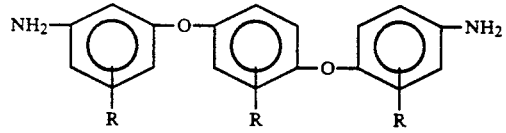

wherein R is a linear alkyl group, an alkoxy group or an alkyloxymethylene group, respectively having at least 12 carbon atoms, and which tetracarboxylic acid is selected from the group consisting of pyromellitic acid, 2,3,6,7-naphthalenetetracarboxylic acid, 1,2,5,6-naphthalenetetracarboxylic acid, 1,4,5,8-naphthalenetetracarboxylic acid 2,3,6,7-anthracenetetracarboxylic acid, 1,2,5,6-anthracenetetracarboxylic acid, 3,3',4,4'-biphenyltetracarboxylic acid, 2,3,3',4-biphenyltetracarboxylic acid, bis(3,4-dicarboxyphenyl)ether, 3,3',4,4'-benzophenonetetracarboxylic acid, bis(3,4-dicarboxyphenyl)sulfone, bis(3,4-dicarboxyphenyl)methane, 2,2-bis(3,4-dicarboxyphenyl)propane, 1,1,1,3,3,3-hexafluoro-2,2-bis(3,4-dicarboxyphenyl)propane, bis(3,4-dicarboxyphenyl)dimethylsilane, bis(3,4-dicarboxyphenyl)diphenylsilane, 2,3,4,5-pyridine tetracarboxylic acid and 2,6-bis(3,4-dicarboxyphenyl)pyridine, and their dianhydrides, and their dicarboxylic acid diacid halides; cyclobutane tetracarboxylic acid, cyclopentane tetracarboxylic acid, cyclohexane tetracarboxylic acid, 2,3,5-tricarboxycyclopentylacetic acid and 3,4-dicarboxy-1,2,3,4-tetrahydro-1-naphthalene succinic acid, and their dianhydrides, and their dicarboxylic acid diacid halides; and butane tetracarboxylic acid, and their dianhydrides, and their dicarboxylic acid diacid halides.

2. The liquid crystal alignment treating agent according to claim 1, wherein the polyimide resin is prepared by reacting a diamine including at least 5 mol % of an aromatic diamine having at least one linear alkyl group of at least 12 carbon atoms per benzene ring as the essential diamine component with a tetracarboxylic acid and its derivative to prepare a polyimide resin precursor having a reduced viscosity of from 0.05 to 3.0 dl/g (concentration: 0.5 g/dl in N-methylpyrrolidone at 30° C.) and converting the polyimide resin precursor thus prepared to a polyimide resin by dehydration-ring closure reaction.

3. The liquid crystal alignment treating agent according to claim 1, wherein the polyimide resin is prepared by reacting a diamine including at least 5 mol % of a linear alkyl group-containing diaminobenzene derivative having the formula (1),

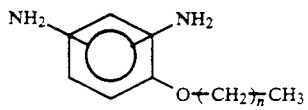

(wherein n is an integer of at least 11) as the essential diamine component with a tetracarboxylic acid and its derivative to prepare a polyimide resin precursor having a reduced viscosity of from 0.05 to 3.0 dl/g (concentration: 0.5 g/dl in N-methylpyrrolidone at 30° C.) and converting the polyimide resin precursor thus prepared into a polyimide resin by dehydration-ring closure reaction.

4. The liquid crystal alignment treating agent according to claim 1, wherein the diamines other than the aromatic diamines are at least one member selected from the group consisting of p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminobiphenylmethane, diaminodiphenylether, 2,2-diaminodiphenylpropane, bis(3,5-diethyl-4-aminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl)hexafluoropropane and 2,2-bis[4-(4-aminophenoxy)phenyl]hexafluoropropane; bis(4-aminocyclohexyl)methane and bis(4-amino-3-methylcyclohexyl)methane; tetramethylenediamine and hexamethylenediamine; and diaminosiloxane of the formula,

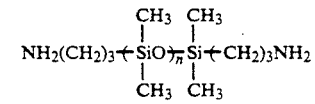

wherein n is an integer of from 1 to 10.

* * * * *